(12) United States Patent
Li et al.

(10) Patent No.: US 11,787,539 B2
(45) Date of Patent: Oct. 17, 2023

(54) CONVERTIBLE AIRCRAFT SYSTEM

(71) Applicants: Xingkang Li, Worcester, MA (US); Heng Ren, Beijing (CN); Qiang Li, Markham (CA); Xingjian Li, Wuhu (CN)

(72) Inventors: Xingkang Li, Worcester, MA (US); Heng Ren, Beijing (CN); Qiang Li, Markham (CA); Xingjian Li, Wuhu (CN)

(*) Notice: Subject to any disclaimer, the term of this patent is extended or adjusted under 35 U.S.C. 154(b) by 400 days.

(21) Appl. No.: 17/220,137

(22) Filed: Apr. 1, 2021

(65) Prior Publication Data
US 2022/0315215 A1    Oct. 6, 2022

(51) Int. Cl.
| | |
|---|---|
| *B64C 37/00* | (2006.01) |
| *B64D 27/10* | (2006.01) |
| *B64C 1/06* | (2006.01) |
| *B64C 27/68* | (2006.01) |
| *B64C 9/00* | (2006.01) |
| *B64C 5/00* | (2006.01) |
| *B64D 31/00* | (2006.01) |

(52) U.S. Cl.
CPC .............. *B64C 37/00* (2013.01); *B64C 1/065* (2013.01); *B64C 5/00* (2013.01); *B64C 9/00* (2013.01); *B64C 27/68* (2013.01); *B64D 27/10* (2013.01); *B64D 31/00* (2013.01); *B64C 2009/005* (2013.01)

(58) Field of Classification Search
CPC ....... B64C 37/00; B64C 27/026; B64C 27/24; B64C 27/22

USPC .......................................................... 244/7 A
See application file for complete search history.

(56) References Cited

U.S. PATENT DOCUMENTS

| | | | | |
|---|---|---|---|---|
| 3,721,403 A | * | 3/1973 | Gray | B64C 27/22 244/7 A |
| 3,884,431 A | | 5/1975 | Burrell | |
| 4,793,572 A | * | 12/1988 | Mecca | B64C 27/24 244/7 R |
| 6,471,158 B1 | * | 10/2002 | Davis | B64C 27/26 244/8 |

(Continued)

FOREIGN PATENT DOCUMENTS

| | | |
|---|---|---|
| EP | 3290337 A1 | 3/2018 |
| EP | 3459843 A1 | 8/2020 |

(Continued)

*Primary Examiner* — Christopher P Ellis (57) ABSTRACT

A convertible aircraft system is provided that can convert to a helicopter configuration, an airplane configuration, or a gyroplane configuration before, during, or after flight. The convertible aircraft system includes a fuselage, a proximal flight assembly, a distal flight assembly, a support spar, and a tail assembly. The fuselage is the main structural body of the present invention. The proximal flight assembly and the distal flight assembly are the flight system of the present invention. The support spar provides an axis of rotation and a pole support for the proximal flight assembly and the distal flight assembly. The tail assembly provides stability during flight of the present invention. In more detail, the tail assembly may comprise at least one vertical stabilizer, at least one horizontal stabilizer, and at least one rudder in order to provide stability during flight of the present invention.

13 Claims, 8 Drawing Sheets

(56) References Cited

U.S. PATENT DOCUMENTS

| | | | |
|---|---|---|---|
| 6,669,137 B1* | 12/2003 | Chen | B64C 29/0025 |
| | | | 244/7 R |
| 7,665,688 B2 | 2/2010 | Cylinder et al. | |
| 10,604,241 B1 | 3/2020 | Dong | |
| 2006/0266879 A1* | 11/2006 | Svoboda | B64C 27/08 |
| | | | 244/7 A |
| 2007/0095969 A1* | 5/2007 | Walliser | B64C 27/26 |
| | | | 244/7 A |
| 2009/0206208 A1* | 8/2009 | Kennedy | B64C 27/18 |
| | | | 416/20 R |
| 2017/0008622 A1* | 1/2017 | Blue | B64C 39/10 |
| 2018/0072413 A1* | 3/2018 | Moshe | B64C 29/0033 |
| 2019/0248492 A1* | 8/2019 | Roldan De Perera | B64C 3/56 |
| 2020/0010182 A1* | 1/2020 | Renteria | B64C 39/024 |

FOREIGN PATENT DOCUMENTS

| | | | | |
|---|---|---|---|---|
| WO | WO-03106259 A2 * | 12/2003 | | B64C 27/28 |
| WO | WO-2016109408 A4 * | 8/2016 | | B64C 27/16 |
| WO | WO2018183535 A1 | 10/2018 | | |

* cited by examiner

CONVERTIBLE AIRCRAFT SYSTEM

FIELD OF THE INVENTION

The present invention relates generally to aircrafts. More specifically, the present invention is a convertible aircraft system that can be converted into a helicopter configuration, an airplane configuration, or a gyroplane configuration before, during, or after flight.

BACKGROUND OF THE INVENTION

There are various types of aircrafts that are used for transportation. The most common types of aircrafts are helicopters and airplanes. Another type of aircraft that is uncommon is a gyroplane. These types of aircrafts include different mechanisms in order to fly and maneuver while in flight. Additionally, these type of aircrafts are primarily used for specific situations and each include advantages and disadvantages. For example, an airplane will fly to a destination faster than a helicopter, whereas a helicopter has more potential landing zones. There exists a need for an aircraft that can utilize all the advantages of these types of aircrafts without any major disadvantages.

It is therefore an objective of the present invention to provide a convertible aircraft system that can be converted into a helicopter configuration, an airplane configuration, or a gyroplane configuration before, during, or after flight. The present invention includes a unique flight system. The unique flight system includes a support spar, a proximal flight assembly, and a distal flight assembly. The proximal flight assembly and the distal flight assembly are coupled to the support spar by at least one lockable rotation mechanism that allows or prevents rotation of a hinged blade of each flight assembly. Moreover, a second elongated portion of the hinged blade is coupled to a first elongated portion of the hinged blade by a hinge mechanism that is used to bistably move the second elongated portion. Based on a desired configuration of the present invention, the user can switch between a locked or rotatable hinged blade and/or a folded or unfolded second elongated portion. Thus, the present invention can be converted into a helicopter configuration, an airplane configuration, or a gyroplane configuration before, during, or after a flight.

DETAIL DESCRIPTIONS OF THE INVENTION

All illustrations of the drawings are for the purpose of describing selected versions of the present invention and are not intended to limit the scope of the present invention.

In reference to FIGS. 1 through 8, the present invention is a convertible aircraft system that can convert to a helicopter configuration, an airplane configuration, or a gyroplane configuration before, during, or after flight. The preferred embodiment of the present invention comprises a fuselage 1, a proximal flight assembly 4, a distal flight assembly 5, a support spar 18, and a tail assembly 19. The fuselage 1 is the main structural body of the present invention. The proximal flight assembly 4 and the distal flight assembly 5 are the flight system of the present invention. The support spar 18 provides an axis of rotation and a pole support for the proximal flight assembly 4 and the distal flight assembly 5. The tail assembly 19 provides stability during flight of the present invention. In more detail, the tail assembly 19 may comprise at least one vertical stabilizer, at least one horizontal stabilizer, and at least one rudder in order to provide stability during flight of the present invention.

The general configuration of the aforementioned components allows the present invention to take flight in a helicopter configuration, an airplane configuration, or a gyroplane configuration. As in standard airplane type aircrafts and with reference to FIGS. 1 and 2, the fuselage 1 comprises a nose 2 and a stern 3. The proximal flight assembly 4 and the distal flight assembly 5 each comprise a hinged blade 6, at least one lockable rotation mechanism 11, a hinge mechanism 14, and at least one thruster 15. The hinged blade 6 comprises a first elongated portion 7 and a second elongated portion 8. The first elongated portion 7 and the second elongated portion 8 are structures that may either act as blades of the helicopter or gyroplane configuration or as wings of the airplane configuration. The at least one lockable rotation mechanism 11 allows or prevents rotation for each the proximal flight assembly 4 and the distal flight assembly 5. The hinge mechanism 14 allows the second elongated portion 8 to be folded out or folded in with respect to the first elongated portion 7. The at least one thruster 15 may be any type of thruster mechanism that either drives each the proximal flight assembly 4 and the distal flight assembly 5 to rotate about the support spar 18 in the helicopter or gyroplane configuration to provide lift or simply provides lift in the airplane configuration. The tail assembly 19 is mounted onto the stern 3 in order to best provide stability during flight of the present invention. The support spar 18 is mounted onto the nose 2. This arrangement positions the support spar 18 in order to provide the optimal mounting of both the proximal flight assembly 4 and the distal flight assembly 5. Moreover, the support spar 18 is oriented orthogonal to a roll axis 24 and fuselage 1 and a pitch axis 25 of the fuselage 1. Thus, the proximal flight assembly 4 and the distal flight assembly 5 can be mounted to the support spar 18 in order to provide an efficient and effective lift for flight of the present invention. The proximal flight assembly 4 and the distal flight assembly 5 are positioned offset from each other along the support spar 18 and are mirrored about the support spar 18. This arrangement allows the proximal flight assembly 4 and the distal flight assembly 5 to rotate around the same axis, but in opposite directions in order to direct the present invention during flight in the helicopter configuration. As mentioned previously, both the proximal flight assembly 4 and the distal flight assembly 5 are mounted to the support spar 18. In more detail, the hinged blade 6 is operatively coupled to the support spar 18 by the at least one lockable rotation mechanism 11. The at least one lockable rotation mechanism 11 is used to allow or prevent rotation of the hinged blade 6 about the support spar 18. For example, the hinged blade 6 is prevented from rotating in the airplane configuration and the hinged blade 6 is allowed to rotate in the helicopter configuration. The second elongated portion 8 is operatively coupled to the first elongated portion 7 by the hinge mechanism 14. The hinge mechanism 14 is used to bistably move the second elongated portion 8. In more detail, the second elongated portion 8 of each the proximal flight assembly 4 and the distal flight assembly 5 can be folded in for the airplane configuration and folded out for the helicopter configuration. Additionally, a length of the first elongated portion 7 is less than a length of the second elongated portion 8. This balances the unequal distribution of mass so that the mass axis of each the proximal flight assembly 4 and the distal flight assembly 5 is the same as the rotation axis. Otherwise, the unmatched centrifugal force produced by rotation of the proximal flight assembly 4 and the distal flight assembly 5 would cause violent vibration.

Figure 1:
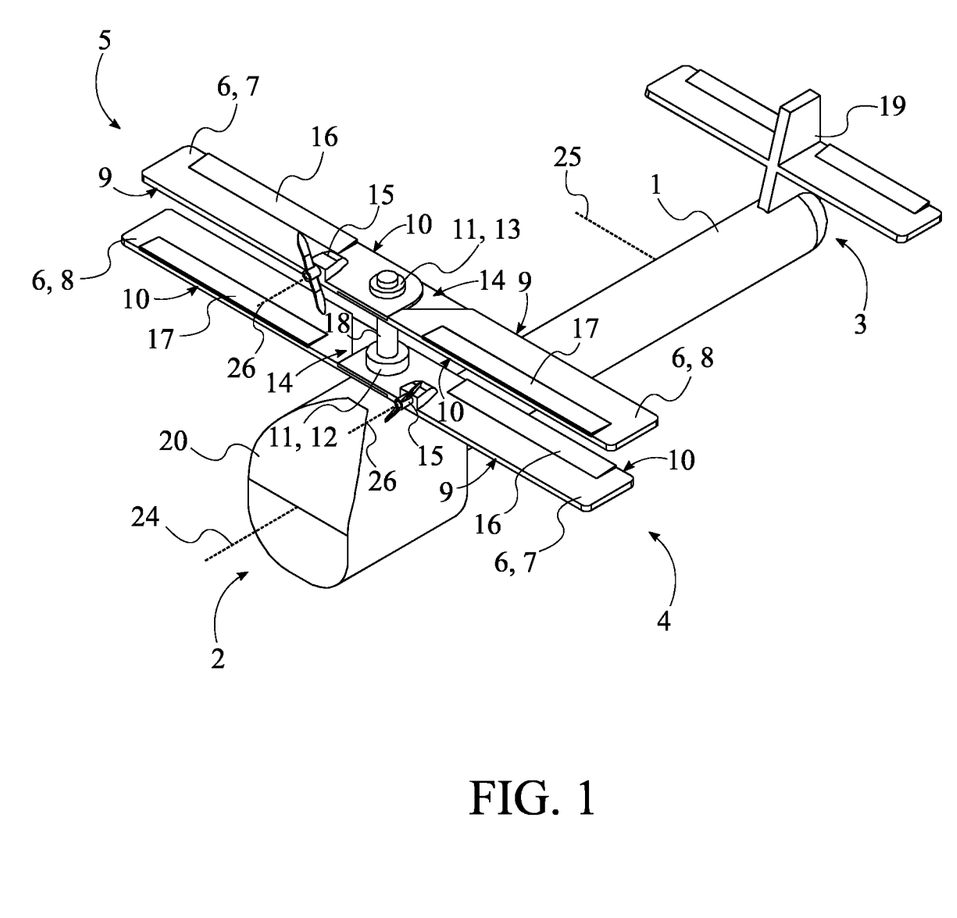
FIG. 1 is a front perspective view of the present invention in the helicopter or gyroplane configuration.
Figure 2:
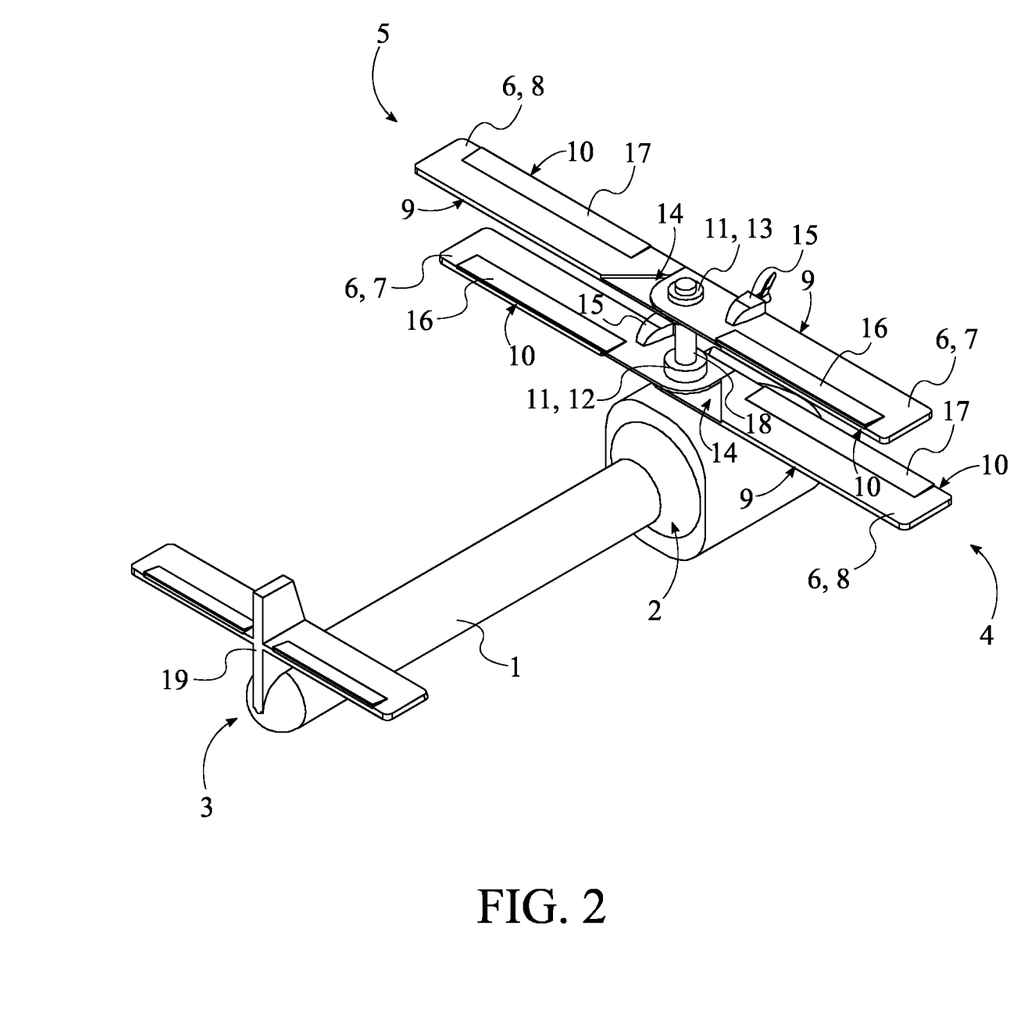
FIG. 2 is a rear perspective view of the present invention in the helicopter or gyroplane configuration.

With reference to FIGS. 1 and 2, the at least one thruster 15 is laterally mounted to the first elongated portion 7 in order to rotate each the proximal flight assembly 4 and the distal flight assembly 5 around the support spar 18 to provide lift in the helicopter configuration or simply provide lift in the airplane configuration. A propulsion axis 26 of the at least one thruster 15 is oriented orthogonal to the first elongated portion 7 and the support spar 18. Thus, the at least one thruster 15 can provide an efficient and effective lift for flight of the present invention. In further detail, the proximal flight assembly 4 and the distal flight assembly 5 are not driven by a spinning shaft as in standard helicopter rotors, but instead the proximal flight assembly 4 and the distal flight assembly 5 are driven by the at least one thruster 15. The at least one thruster 15 drives the first elongated portion 7 forward and produces torque to make each the proximal flight assembly 4 and the distal flight assembly 5 rotate around the support spar 18. Just like the free spinning rotor of a gyroplane, the proximal flight assembly 4 and the distal flight assembly 5 exert no reaction torque on the fuselage 1. The at least one thruster 15 is preferably a propeller system or a turbine engine system.

Figure 3:
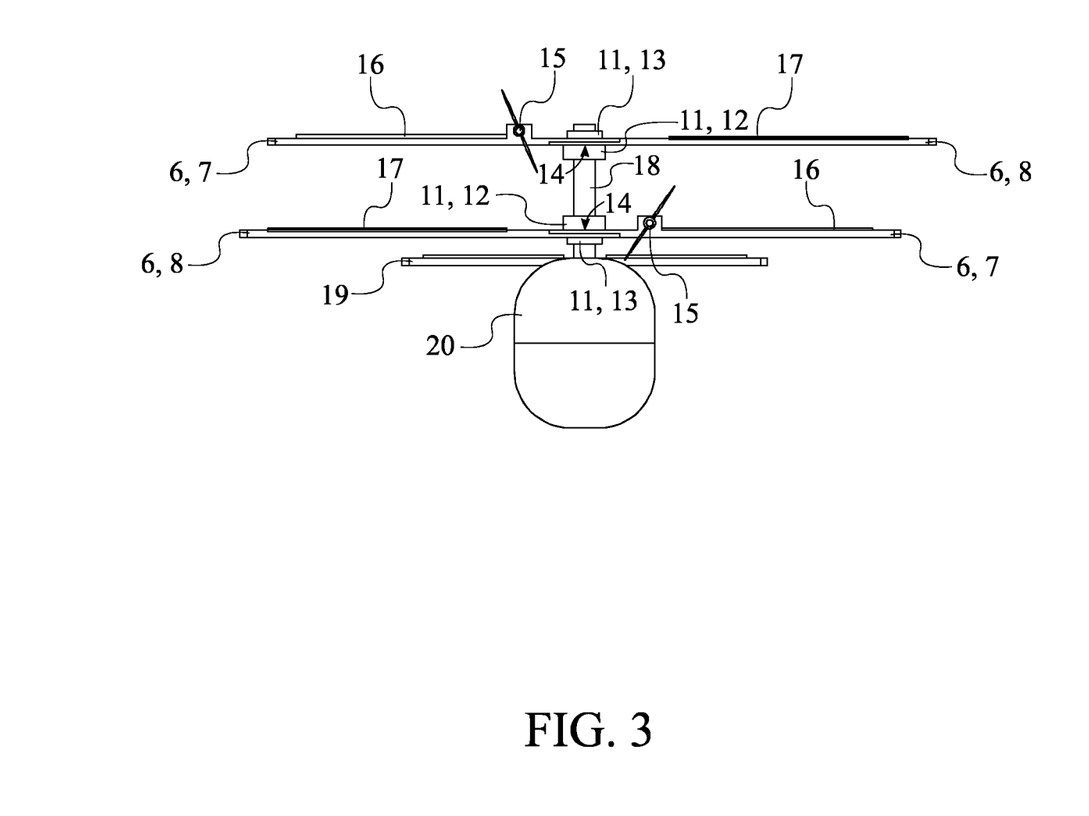
FIG. 3 is a front view of the present invention in the helicopter or gyroplane configuration.
Figure 5:
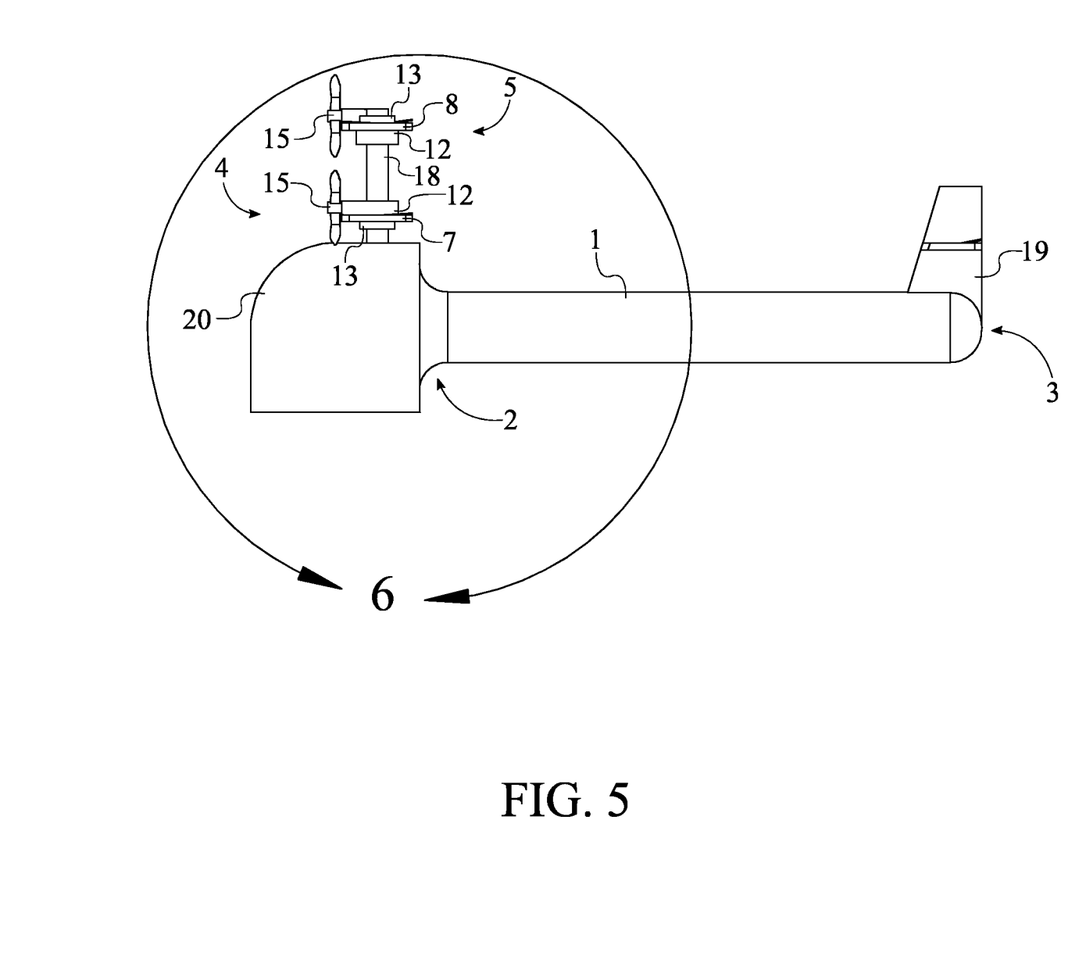
FIG. 5 is a right-side view of the present invention in the helicopter or gyroplane configuration.

In one embodiment of the present invention and with reference to FIGS. 3 and 5, the at least one lockable rotation mechanism 11 comprises a first lockable rotation mechanism 12 and a second lockable rotation mechanism 13. This embodiment allows the first elongated portion 7 and the second elongated portion 8 to separately rotate about the support spar 18. The first elongated portion 7 is operatively coupled to the support spar 18 by the first lockable rotation mechanism 12. The first lockable rotation mechanism 12 is used to allow and prevent rotation of the first elongated portion 7 about the support spar 18. Thus, the first elongated portion 7 can freely rotate about the support spar 18 when the first lockable rotation mechanism 12 is in an unlocked state, and the first elongated portion 7 is prevented from rotating about the support spar 18 when the first lockable rotation mechanism 12 is in a locked state. Similarly, the second elongated portion 8 is operatively coupled to the support spar 18 by the second lockable rotation mechanism 13. The second lockable rotation mechanism 13 is used to allow and prevent rotation of the second elongated portion 8 about the support spar 18. Thus, the second elongated portion 8 can freely rotate about the support spar 18 when the second lockable rotation mechanism 13 is in an unlocked state, and the second elongated portion 8 is prevented from rotating about the support spar 18 when the second lockable rotation mechanism 13 is in a locked state.

In another embodiment of the present invention, the at least one lockable rotation mechanism 11 includes only the first lockable rotation mechanism 12. Thus, only the first elongated portion 7 is able to rotate about the support spar 18 in this embodiment. The first elongated portion 7 is operatively coupled to the support spar 18 by the first lockable rotation mechanism 12. The first lockable rotation mechanism 12 is used to allow and prevent rotation of the first elongated portion 7 about the support spar 18. Thus, the first elongated portion 7 can freely rotate about the support spar 18 when the first lockable rotation mechanism 12 is in an unlocked state, and the first elongated portion 7 is prevented from rotating about the support spar 18 when the first lockable rotation mechanism 12 is in a locked state. In further detail, as the first elongated portion 7 rotates about the support spar 18, the second elongated portion 8 rotates with the first elongated portion 7 through the connection between two through the hinge mechanism 14.

Figure 7:
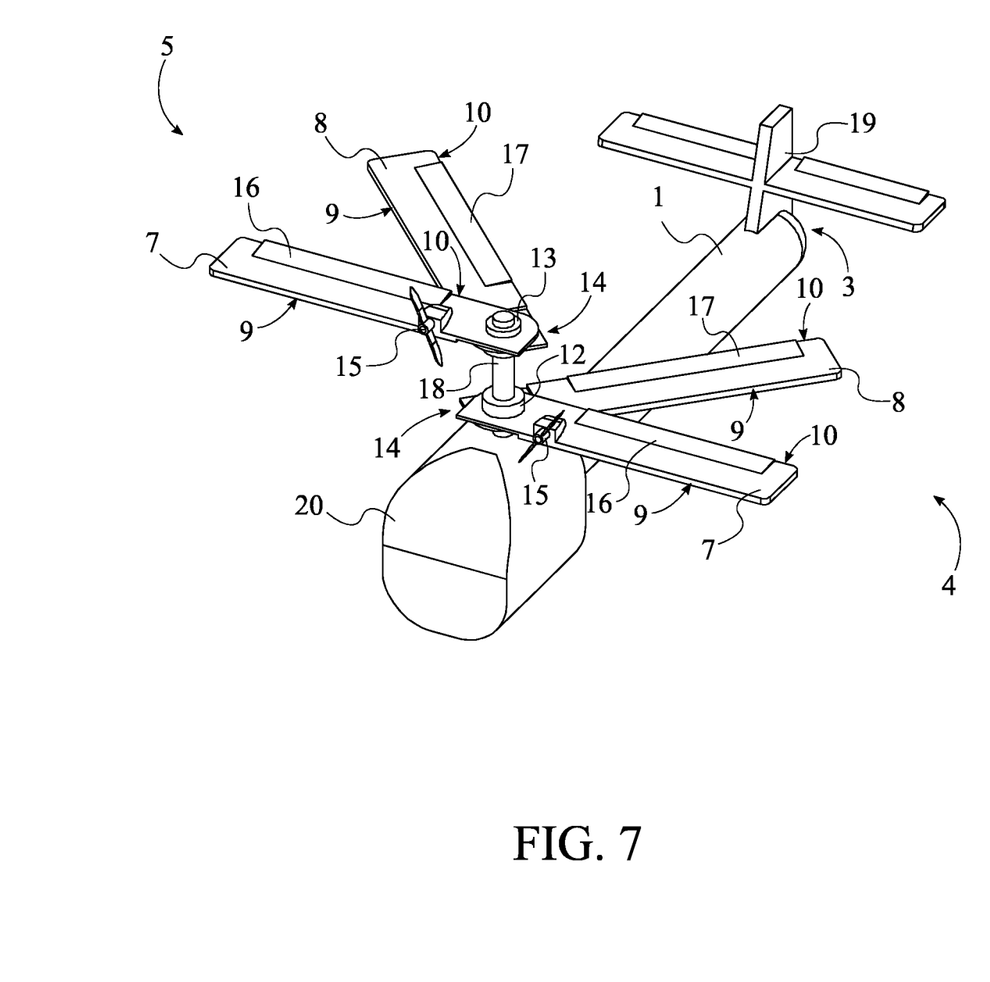
FIG. 7 is a front perspective view of the present invention in the airplane configuration.

In order to prevent the second elongated portion 8 from over-rotating when the present invention is switching from one configuration to another and with reference to FIGS. 1 and 7, the hinge mechanism 14 is configured to bistably restrict a degree of freedom between the first elongated portion 7 and the second elongated portion 8. In further detail, the hinge mechanism 14 includes a joint structure designed that when the first elongated portion 7 spins forward, the first elongated portion 7 pushes the second elongated portion 8 to spin with it and together, the first elongated portion 7 and the second elongated portion 8 provide the needed lift for the present invention to take off in the helicopter configuration. The first elongated portion 7 is capable of being locked against the support spar 18 to a position that is perpendicular to the fuselage 1 of the present invention or other preferred positions through the first lockable rotation mechanism 12. When the first elongated portion 7 suddenly stops spinning, the momentum would keep the second elongated portion 8 rotating about the support spar 18. The second elongated portion 8 can then either be locked to a preferred position by using the second lockable rotation mechanism 13 or rotate all the way until it hits the first elongated portion 7 from behind to be locked to the first elongated portion 7. By folding the second elongated portion 8 and creating an angle between the first elongated portion 7 and the second elongated portion 8 which is less than or equal to 90 degrees, the airfoil of the second elongated portion 8 is prevented from being put into a backward position. In more detail, a backward position would be a thin trailing edge 10 of the second elongated portion 8 facing the incoming airflow. When the angle between the first elongated portion 7 and the second elongated portion 8 is 90 degrees, the second elongated portion 8 is parallel to the fuselage 1. Thus, drag is minimized for the airplane configuration. When the angle between the first elongated portion 7 and the second elongated portion 8 is less than 90 degrees, the second elongated portion 8 becomes an oblique wing. Because the first elongated portion 7 and the second elongated portion 8 are generally narrower than the fixed wings of a standard airplane, the combination of a wing made by the first elongated portion 7 and the second elongated portion 8 aid to provide more lift for the present invention in the airplane configuration.

In order for the present invention to be piloted by a user and with reference to FIGS. 3 and 5, the present invention may further comprise a cockpit 20. As in standard aircrafts, the cockpit 20 may comprise a flight user interface in order to pilot the present invention. The cockpit 20 is integrated into the nose 2 in order to provide an optimal visual position to pilot the present invention.

Figure 6:
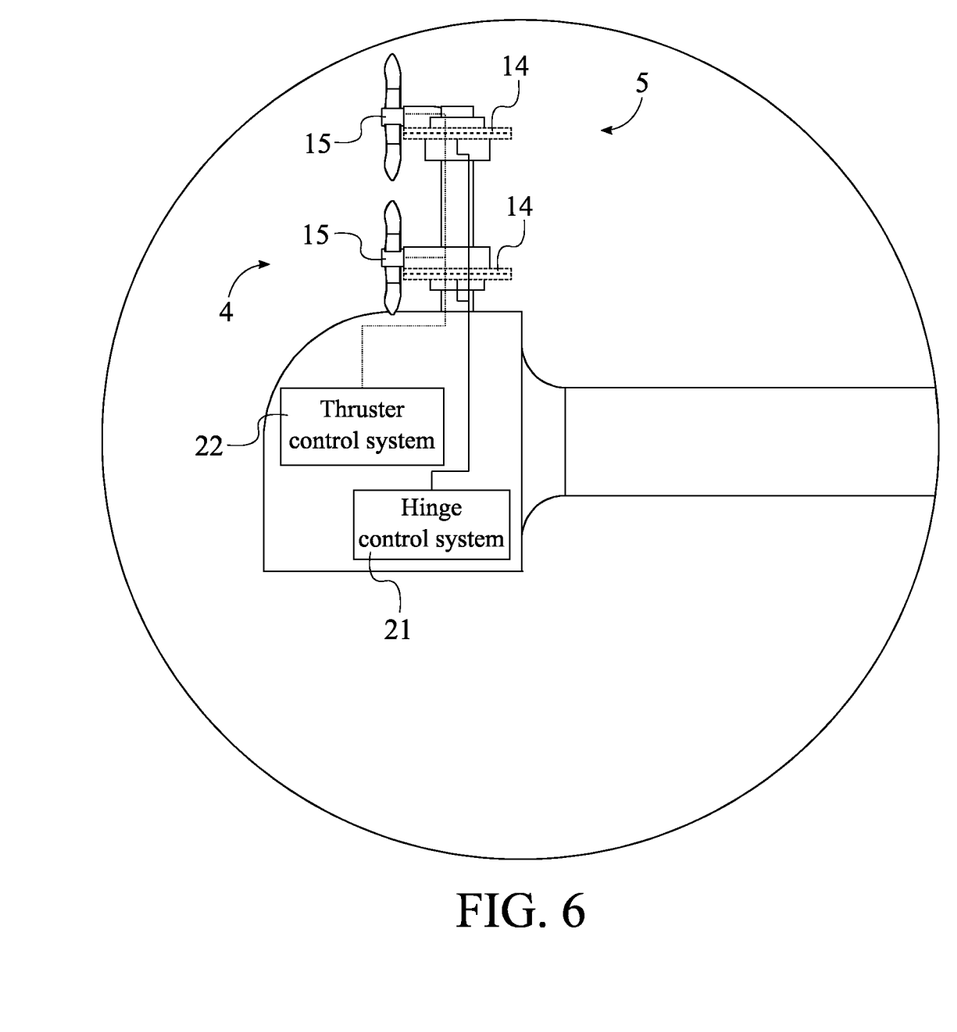
FIG. 6 is a detailed view taken about circle 6 in FIG. 5 displaying the electronic connections of the thruster control system and the hinge control system.

In order for the second elongated portion 8 of each the proximal flight assembly 4 and the distal flight assembly 5 to be remotely folded in or folded out and with reference to FIG. 6, the present invention may further comprise a hinge control system 21. The hinge control system 21 is mounted within the fuselage 1 in order to be protected and concealed from environmental hazards. In another embodiment of the present invention, the hinge control system 21 is mounted within the cockpit 20 in order to be operated by a user piloting the present invention. The hinge control system 21 is electronically connected to the hinge mechanism 14 of the proximal flight assembly 4 and the hinge mechanism 14 of the distal flight assembly 5. Thus, the hinge control system 21 can be used to automatically fold in or fold out the second elongated portion 8 of each the proximal flight assembly 4 and the distal flight assembly 5 before, during, or after flight of the present invention.

In order to remotely control the power of the at least one thruster 15 of each the proximal flight assembly 4 and the distal flight assembly 5 and with reference to FIG. 6, the present invention may further comprise a thruster control system 22. The thruster control system 22 is mounted within the fuselage 1 in order to be protected and concealed from environmental hazards. In another embodiment of the present invention, the thruster control system 22 is mounted within the cockpit 20 in order to be operated by a user piloting the present invention. The thruster control system 22 is electronically connected to the at least one thruster 15 of the proximal flight assembly 4 and to the at least one thruster 15 of the distal flight assembly 5. Thus, the thruster control system 22 can be used to remotely control the power of the at least one thruster 15 of the proximal flight assembly 4 and the at least one thruster 15 of the distal flight assembly 5. The thruster control system 22 can be used to adjust the speed of the present invention during flight in the airplane configuration. In a particular embodiment, a slip ring is used as the rotating electrical connector to conduct electrical signals from the hinge control system 21 and the thruster control system 22 respectively to the hinge mechanism 14 of both the proximal flight assembly 4 and the distal flight assembly 5, and to the at least one thruster 15 of both the proximal flight assembly 4 and the distal flight assembly 5.

The yaw rotation of the present invention in the helicopter configuration is controlled by the at least one lockable rotation mechanism 11 of the proximal flight assembly 4, the at least one lockable rotation mechanism 11 of the distal flight assembly 5, and the thruster control system 22. In more detail, when the fuselage 1 needs to be turned to left, the at least one lockable rotation mechanism 11 of the proximal flight assembly 4, which spins counter-clockwise, slows down the rotation of the hinged blade 6 of the proximal flight assembly 4. This changes an angular momentum of the proximal flight assembly 4 exerted to the support spar 18, and thus, forces the fuselage 1 to spin left. To compensate for the lost lift and to avoid losing altitude, the thruster control system 22 increases the power of the at least one thruster 15 of the distal flight assembly 5 in order to increase the lift. When the fuselage 1 needs to be turned right, the at least one lockable rotation mechanism 11 of the distal flight assembly 5, which spins clockwise, slows the rotation of the hinged blade 6 of the distal flight assembly 5. This changes an angular momentum of the distal flight assembly 5 exerted to the support spar 18, and thus, forces the fuselage 1 to spin right. To compensate for the lost lift and to avoid losing altitude, the thruster control system 22 increases the power of the at least one thruster 15 of the proximal flight assembly 4 in order to increase the lift.

Figure 4:
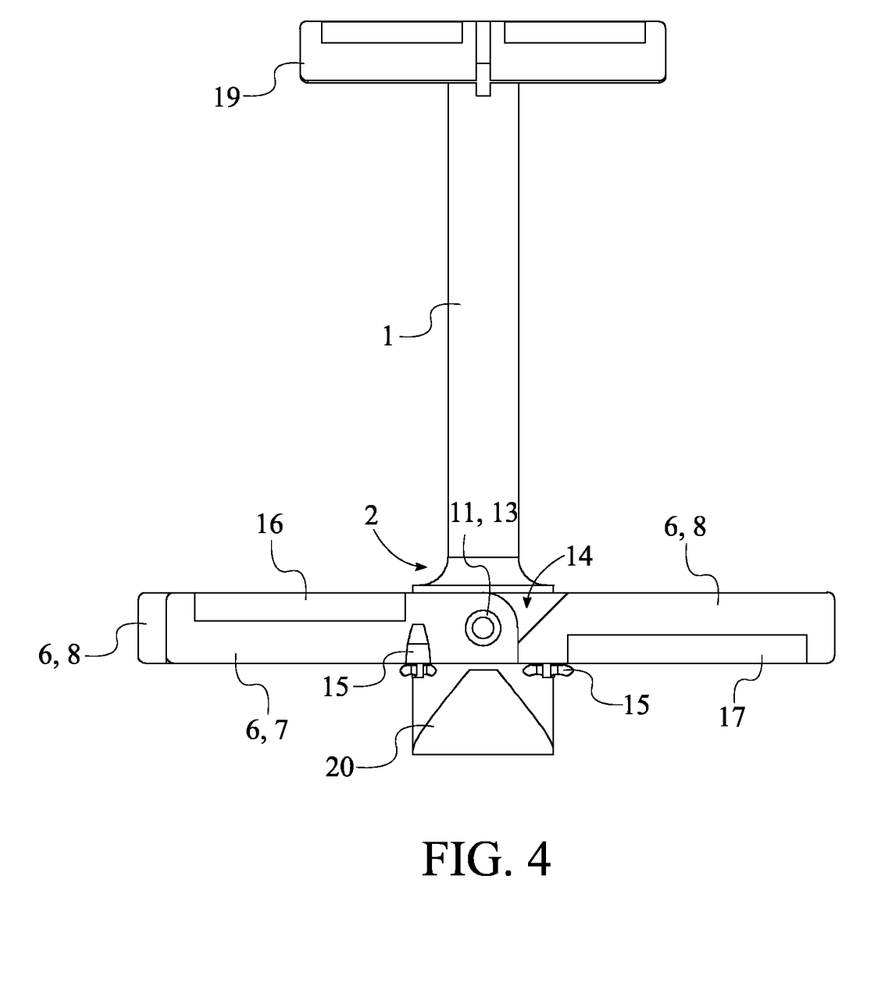
FIG. 4 is a top view of the present invention in the helicopter or gyroplane configuration.

In order to keep the at least one thruster 15 always perpendicular to the axis of the rotation of the first elongated portion 7 and with reference to FIGS. 1 and 4, the angle of incidence of the first elongated portion 7 and the second elongated portion 8 is fixed and the proximal flight assembly 4 and the distal flight assembly 5 each may further comprise a first aileron 16 and a second aileron 17. The first elongated portion 7 and the second elongated portion 8 each comprise a leading edge 9 and a trailing edge 10. The first aileron 16 is hingedly connected onto the first elongated portion 7 and is positioned along the trailing edge 10 of the first elongated portion 7. Similarly, the second aileron 17 is hingedly connected onto the second elongated portion 8 and is positioned along the trailing edge 10 of the second elongated portion 8. This arrangement allows the first aileron 16 and the second aileron 17 to be tilted or be deflected up and down in order for the first aileron 16 and the second aileron 17 to be used for collective and cyclic controls when the present invention is flying in the helicopter configuration during taking off and landing. During rotation, the cyclic control enables the fuselage 1 to tilt forward and back (pitch) or sideways (roll) through cyclically altering the angle of the first aileron 16 and the second aileron 17 relative to the first elongated portion 7 and the second elongated portion 8. Meantime, the third rotation, yaw, is controlled by the thruster control system 22 and the at least one lockable rotation mechanism 11.

As mentioned previously and with reference to FIGS. 1 and 2, the present invention can be converted to a helicopter configuration and the following arrangements are necessary for the present invention to be in the helicopter configuration. The second elongated portion 8 of the proximal flight assembly 4 is fixed colinear to the first elongated portion 7 of the proximal flight assembly 4 by the hinge mechanism 14 of the proximal flight assembly 4. In more detail, the second elongated portion 8 of the proximal flight assembly 4 is folded out in order for the first elongated portion 7 and the second elongated portion 8 of the proximal flight assembly 4 to form one helicopter rotor. Further, the first elongated portion 7 of the proximal flight assembly 4 is rotatably mounted to the support spar 18 by the at least one lockable rotation mechanism 11 of the proximal flight assembly 4. This allows the proximal flight assembly 4 to freely rotate around the support spar 18. Similarly, the second elongated portion 8 of the distal flight assembly 5 is fixed colinear to the first elongated portion 7 of the distal flight assembly 5 by the hinge mechanism 14 of the distal flight assembly 5. In more detail, the second elongated portion 8 of the distal flight assembly 5 is folded out in order for the first elongated portion 7 and the second elongated portion 8 of the distal flight assembly 5 to form another helicopter rotor. Further, the first elongated portion 7 of the distal flight assembly 5 is rotatably mounted to the support spar 18 by the at least one lockable rotation mechanism 11 of the distal flight assembly 5. This allows the distal flight assembly 5 to freely rotate around the support spar 18.

Figure 8:
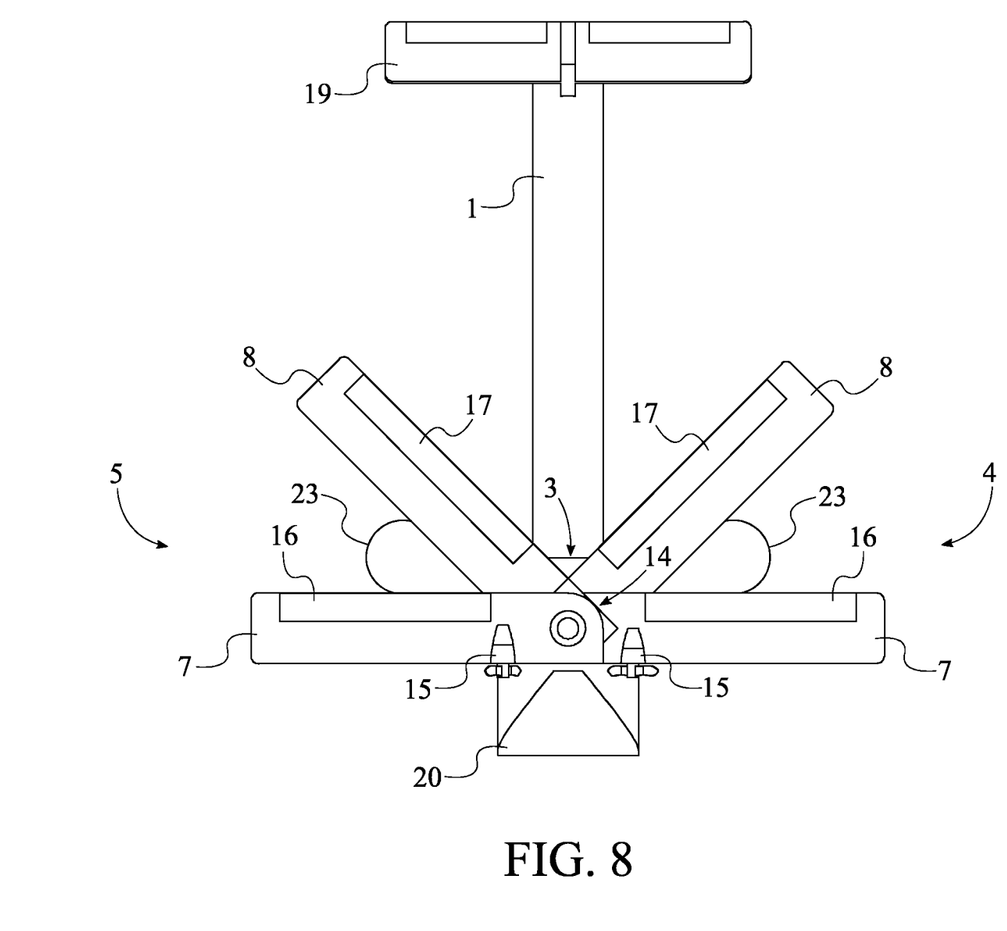
FIG. 8 is a top view of the present invention in the airplane configuration.

Alternatively and with reference to FIGS. 7 and 8, the present invention can be converted into an airplane configuration and the following arrangements are necessary for the present invention to be in the airplane configuration. The second elongated portion 8 of the proximal flight assembly 4 is fixed at an acute angle 23 to the first elongated portion 7 of the proximal flight assembly 4 by the hinge mechanism 14 of the proximal flight assembly 4. This arrangement folds in the second elongated portion 8 of the proximal flight assembly 4 in order for only the first elongated portion 7 of the proximal flight assembly 4 to form a first wing. Without folding in the second elongated portion 8, the trailing edge 10 of the second elongated portion 8 would face the incoming airflow and, thus, the second elongated portion 8 would separate the airflow resulting in greater drag. Additionally, this arrangement increases the lift-to-drag ratio. Further, the first elongated portion 7 of the proximal flight assembly 4 is fixed parallel to the pitch axis of the fuselage 1 by the at least one at least one lockable rotation mechanism 11 of the proximal flight assembly 4. This arrangement prevents the first elongated portion 7 of the proximal flight assembly 4 from rotating and, therefore, locks the first elongated portion 7 as the first fixed wing of the airplane configuration. The at least one thruster 15 of the proximal flight assembly 4 still pushes the first elongated portion 7 of the proximal flight assembly 4 forward, only this time, the entire present invention moves forward with them. The first aileron 16 and the second aileron 17 with the at least one thruster 15, together with the vertical and horizontal stabilizers, rudders of the tail assembly 19, provide full control of the present invention when it flies in the airplane configuration. Similarly, the second elongated portion 8 of the distal flight assembly 5 is fixed at an acute angle 23 to the first elongated portion 7 of the distal flight assembly 5 by the hinge mechanism 14 of the distal flight assembly 5. This arrangement folds in the second elongated portion 8 of the distal flight assembly 5 in order for the first elongated portion 7 and the second elongated portion 8 of the distal flight assembly 5 to form a second wing. Further, the first elongated portion 7 of the distal flight assembly 5 is fixed parallel to the pitch axis of the fuselage 1 by the at least one lockable rotation mechanism 11 of the distal flight assembly 5. This arrangement prevents the first elongated portion 7 of the distal flight assembly 5 from rotating and, therefore, locks the first elongated portion 7 and the second elongated portion 8 of the distal flight assembly 5 as the second fixed wing of the airplane configuration. The at least one thruster 15 of the distal flight assembly 5 still pushes the first elongated portion 7 of the distal flight assembly 5 forward, only this time, the entire present invention moves forward with them.

As another alternative and with reference to FIGS. 1 and 2, the present invention can be converted into a gyroplane configuration and the following arrangements are necessary for the present invention to be in the gyroplane configuration. For the gyroplane configuration, the proximal flight assembly 4 is locked as a fixed wing similarly as in the airplane configuration and the distal flight assembly 5 is set as a rotor similarly as in the helicopter configuration, or vice versa. The gyroplane configuration can serve as the transition between the airplane configuration and the helicopter configuration. More specifically, the second elongated portion 8 of the proximal flight assembly 4 is fixed colinear to the first elongated portion 7 of the proximal flight assembly 4 by the hinge mechanism 14 of the proximal flight assembly 4. In more detail, the second elongated portion 8 of the proximal flight assembly 4 is folded out in order for the first elongated portion 7 and the second elongated portion 8 of the proximal flight assembly 4 to form a single pair of wings. Further, the first elongated portion 7 of the proximal flight assembly 4 is fixed parallel to the pitch axis of the fuselage 1 by the at least one lockable rotation mechanism 11 of the proximal flight assembly 4. This arrangement prevents the first elongated portion 7 of the proximal flight assembly 4 from rotating and, therefore, locks the first elongated portion 7 and the second elongated portion 8 of the proximal flight assembly 4 as a pair of fixed wings of the gyroplane configuration. Moreover, the second elongated portion 8 of the distal flight assembly 5 is fixed colinear to the first elongated portion 7 of the distal flight assembly 5 by the hinge mechanism 14 of the distal flight assembly 5. This arrangement folds out the second elongated portion 8 of the distal flight assembly 5 in order for the first elongated portion 7 and the second elongated portion 8 of the distal flight assembly 5 to be used a single gyroplane rotor. Further, the first elongated portion 7 of the distal flight assembly 5 is rotatably mounted to the support spar 18 by the at least one lockable rotation mechanism 11 of the distal flight assembly 5. This allows the distal flight assembly 5 to freely rotate around the support spar 18.

Alternatively, the gyroplane configuration can include only one fixed wing instead of a pair of fixed wings using the proximal flight assembly 4. More specifically, the second elongated portion 8 of the proximal flight assembly 4 is fixed at an acute angle 23 to the first elongated portion 7 of the proximal flight assembly 4 by the hinge mechanism 14 of the proximal flight assembly 4. This arrangement folds in the second elongated portion 8 of the proximal flight assembly 4 in order for the first elongated portion 7 and the second elongated portion 8 of the proximal flight assembly 4 to form a fixed wing. Without folding in the second elongated portion 8, the trailing edge 10 of the second elongated portion 8 would face the incoming airflow and, thus, the second elongated portion 8 would separate the airflow resulting in greater drag. Additionally, this arrangement increases the lift-to-drag ratio. Further, the first elongated portion 7 of the proximal flight assembly 4 is fixed parallel to the pitch axis of the fuselage 1 by the at least one at least one lockable rotation mechanism 11 of the proximal flight assembly 4. This arrangement prevents the first elongated portion 7 of the proximal flight assembly 4 from rotating and, therefore, locks the first elongated portion 7 and the second elongated portion 8 as the fixed wing of the gyroplane configuration.

Although the invention has been explained in relation to its preferred embodiment, it is to be understood that many other possible modifications and variations can be made without departing from the spirit and scope of the invention as hereinafter claimed.

What is claimed is:
1. A convertible aircraft system comprises:
a fuselage;
a proximal flight assembly;
a distal flight assembly;
a support spar;
a tail assembly;
the fuselage comprises a nose and a stern;
the proximal flight assembly and the distal flight assembly each comprise a hinged blade, at least one lockable rotation mechanism, a hinge mechanism, and at least one thruster;
the hinged blade comprises a first elongated portion and a second elongated portion;
the tail assembly being mounted onto the stern;
the support spar being mounted onto the nose;
the support spar being oriented orthogonal to a roll axis of the fuselage and a pitch axis of the fuselage;
the hinged blade being operatively coupled to the support spar by the lockable rotation mechanism, wherein the lockable rotation mechanism is used to allow and prevent rotation of the hinged blade about the support spar;
the first elongated portion being operatively coupled to the second elongated portion by the hinge mechanism, wherein the hinge mechanism is used to bistably move the second elongated portion;

the at least one thruster being laterally mounted to the first elongated portion;

a propulsion axis of the at least one thruster being oriented orthogonal to the first elongated portion and the support spar; and the proximal flight assembly and the distal flight assembly being positioned offset from each other along the support spar.

2. The convertible aircraft system as claimed in claim 1 comprises:

the at least one lockable rotation mechanism comprises a first lockable rotation mechanism and a second lockable rotation mechanism;

the first elongated portion being operatively coupled to the support spar by the first lockable rotation mechanism, wherein the first lockable rotation mechanism is used to allow and prevent rotation of the first elongated portion about the support spar; and the second elongated portion being operatively coupled to the support spar by the second lockable rotation mechanism, wherein the second lockable rotation mechanism is used to allow and prevent rotation of the second elongated portion about the support spar.

3. The convertible aircraft system as claimed in claim 1, wherein the hinge mechanism is configured to bistably restrict a degree of freedom between the first elongated portion and the second elongated portion.

4. The convertible aircraft system as claimed in claim 1 comprises:

a cockpit; and the cockpit being integrated into the nose.

5. The convertible aircraft system as claimed in claim 1 comprises:

a hinge control system;

the hinge control system being mounted within the fuselage; and the hinge control system being electronically connected to the hinge mechanism of the proximal flight assembly and the hinge mechanism of the distal flight assembly.

6. The convertible aircraft system as claimed in claim 1 comprises:

a thruster control system;

the thruster control system being mounted within the fuselage; and the thruster control system being electronically connected to the at least one thruster of the proximal flight assembly and the at least one thruster of the distal flight assembly.

7. The convertible aircraft system as claimed in claim 1 comprises:

the proximal flight assembly and the distal flight assembly each further comprise a first aileron and a second aileron;

the first elongated portion and the second elongated portion each comprise a leading edge and a trailing edge;

the first aileron being hingedly connected onto the first elongated portion;

the first aileron being positioned along the trailing edge of the first elongated portion;

the second aileron being hingedly connected onto the second elongated portion; and the second aileron being positioned along the trailing edge of the second elongated portion.

8. The convertible aircraft system as claimed in claim 1 comprises:

wherein the proximal flight assembly and the distal flight assembly are arranged into a helicopter configuration;

the second elongated portion of the proximal flight assembly being fixed colinear to the first elongated portion of the proximal flight assembly by the at least one lockable rotation mechanism of the proximal flight assembly;

the first elongated portion of the proximal flight assembly being rotatably mounted to the support spar by the at least one lockable rotation mechanism of the proximal flight assembly;

the second elongated portion of the distal flight assembly being fixed colinear to the first blade of the distal flight assembly by the at least one lockable rotation mechanism of the distal flight assembly; and the first elongated portion of the distal flight assembly being rotatably mounted to the support spar by the at least one lockable rotation mechanism of the distal flight assembly.

9. The convertible aircraft system as claimed in claim 1 comprises:

wherein the proximal flight assembly and the distal flight assembly are arranged into an airplane configuration;

the second elongated portion of the proximal flight assembly being fixed at an acute angle to the first elongated portion of the proximal flight assembly by the at least one lockable rotation mechanism of the proximal flight assembly;

the first elongated portion of the proximal flight assembly being fixed parallel to the pitch axis of the fuselage by the at least one lockable rotation mechanism of the proximal flight assembly;

the second elongated portion of the distal flight assembly being fixed at an acute angle to the first elongated portion of the distal flight assembly by the at least one lockable rotation mechanism of the distal flight assembly; and the first elongated portion of the distal flight assembly being fixed parallel to the pitch axis of the fuselage by the at least one lockable rotation mechanism of the distal flight assembly.

10. The convertible aircraft system as claimed in claim 1 comprises:

wherein the proximal flight assembly and the distal flight assembly are arranged into a gyroplane configuration;

the second elongated portion of the proximal flight assembly being fixed colinear to the first elongated portion of the proximal flight assembly by the at least one lockable rotation mechanism of the proximal flight assembly;

the first elongated portion of the proximal flight assembly being fixed parallel to the pitch axis of the fuselage by the lockable rotation mechanism of the proximal flight assembly;

the second elongated portion of the distal flight assembly being fixed colinear to the first elongated portion of the distal flight assembly by the at least one lockable rotation mechanism of the distal flight assembly; and the first elongated portion of the distal flight assembly being rotatably mounted to the support spar by the at least one lockable rotation mechanism of the distal flight assembly.

11. The convertible aircraft system as claimed in claim 1 comprises, wherein a length of the first elongated portion is less than a length of the second elongated portion.

12. The convertible aircraft system as claimed in claim 1 comprises, wherein the at least one thruster is a propeller system.

13. The convertible aircraft system as claimed in claim 1 comprises, wherein the at least one thruster is a turbine engine system.

* * * * *